United States Patent [19]
Gagnon

[11] Patent Number: 4,764,881
[45] Date of Patent: Aug. 16, 1988

[54] COMPUTER CONTROLLED ALTAZIMUTH TELESCOPE MOUNT

[75] Inventor: Gilbert H. Gagnon, San Marcos, Calif.

[73] Assignee: James R. Cook, San Marcos, Calif.; a part interest

[21] Appl. No.: 827,407

[22] Filed: Feb. 10, 1986

[51] Int. Cl.⁴ .................................... G05B 19/40
[52] U.S. Cl. ............................. 364/559; 364/516; 350/568
[58] Field of Search ............ 364/559, 516; 356/300; 318/603; 248/183; 33/15 C; 350/568

[56] References Cited

U.S. PATENT DOCUMENTS

| | | | |
|---|---|---|---|
| 3,893,746 | 7/1975 | McMahon | 350/83 |
| 3,942,865 | 3/1976 | Rand | 350/83 |
| 3,951,511 | 4/1976 | Parsons | 350/83 |
| 4,050,318 | 9/1977 | Wolf | 74/89.15 |
| 4,285,567 | 8/1981 | Hansen | 350/83 |
| 4,535,961 | 8/1985 | Sobczek et al. | 248/183 |
| 4,536,847 | 8/1985 | Erickson et al. | 364/559 |
| 4,541,294 | 9/1985 | Byers | 74/89.14 |
| 4,682,091 | 7/1987 | Krewalk et al. | 318/603 |

FOREIGN PATENT DOCUMENTS 59-15215  1/1984  Japan.
511559    4/1976  U.S.S.R..

Primary Examiner—Parshotam S. Lall
Assistant Examiner—Ellis B. Ramirez
Attorney, Agent, or Firm—Baker, Maxham & Jester

[57] ABSTRACT

A telescope is supported by an altazimuth mount driven by altitude and azimuth stepper motors. The mount is initially oriented by pointing the telescope at a reference location in the sky such as a known star and inputting its coordinates to a microprocessor-based control system. The telescope is then pointed at a target location such as a second known star and its coordinates are inputted. The microprocessor then executes a stored program that allows it to calculate the zenith coordinates (overhead point) from the coordinates of the reference and target locations, the angles the stepper motors traveled between the two pointings of the telescope, and the elapsed time between the pointings. The observer can then input the coordinates of any selected location and the telescope will automatically point at that selected location so that it can be viewed. The microprocessor also periodically re-positions the telescope to track the selected location and thereby compensate for the earth's rotation.

1 Claim, 6 Drawing Sheets

COMPUTER CONTROLLED ALTAZIMUTH TELESCOPE MOUNT

BACKGROUND OF THE INVENTION

The present invention relates to astronomical telescopes, and more particularly, to a system that will automatically point a telescope at a selected location in the sky and automatically track that location.

Numerous designs have been provided in the prior art for mounting astronomical telescopes. One well known type is referred to as an "equatorial mount" which includes a rotatable polar shaft, a stationary support for the polar shaft, a rotatable declination shaft which is secured to the telescope, and a member which is secured to the polar shaft and which rotatably supports the declination shaft. In use, the polar shaft is positioned with its axis in the direction of the north star, and the telescope is initially fixed on a target star, planet or moon by rotating it on the shaft axes to a certain position.

Because of the rotation of the earth, the polar shaft must be slowly rotated in order to hold the telescope fixed on the selected object, and both automatic and manual drive mechanisms have been provided for this purpose. The automatic devices have usually included a small motor, such as a mechanical clock work or a synchronous motor, which is secured to the stationary support and is connected through gears to the polar shaft for rotating the polar shaft at sidereal rate.

A prior art automatic drive mechanism of the foregoing character has a number of drawbacks. It is a relatively complicated and expensive mechanism which cannot readily be installed by an average amateur astronomer. In addition, to obtain the necessary torque to turn the polar shaft, a rather large diameter gear must be attached to the polar shaft. Further, it is often desirable to be able to make small changes in the rate of rotation to maintain a fix on a planet or the moon and this is relatively difficult or not possible with conventional mechanisms.

Early observers used an altazimuth mounting in which one axis (altitude) was horizontal and the other (azimuth) vertical. Its problem is that both axes must be driven, and at rates that vary with the position. Given that a computer can easily handle the variable drive rates, the gain in reverting to an altazimuth mounting is enormous and becomes more important as the telescope gets bigger. Rotation about the vertical azimuth axis does not change the orientation of the telescope tube with respect to gravity, so that this motion does not change any aspect of the flexure of the support. In effect an altazimuth mounting is a fork mounting with the axis vertical so that the tines have no transverse load at all. Not only is the system much better able to support the load, but it obviates the twisting of the fork tines that makes it so difficult to design the declination axle bearings of the equatorially mounted telescope. Longer tines are now practicable and the horizontal elevation (altitude) axle can be nearer the mid-point of the telescope tube.

Heretofore nobody has provided a satisfactory means for readily orienting an altazimuth telescope mount and for overcoming the inherent difficulty of finding and tracking celestial objects with a telescope mounted in an altazimuth mount.

Japanese Pat. No. 15215 discloses a method and micro-computer based system for automatically directing an equatorial mounted astronomical telescope so as to capture a particular celestial body whose catalog name is inputted through a keyboard. The micro-computer performs the necessary calculations and drives declination and right-ascension stepping motors.

Russian Pat. No. 511559 also appears to disclose a computer based declination and right-ascension control for a telescope mount. Keyboard inputs are apparently used for some sort of correction. The system has improved tracking capability, but it does not appear that the system automatically searches for an inputted celestial object.

Various "Equatorial" telescope mounts, sidereal drives, and other marginally relevant mechanisms are disclosed in U.S. Pat. Nos. 3,893,746, 3,942,865, 3,951,511, 4,050,318, 4,285,567 and 4,541,294.

SUMMARY OF THE INVENTION

It is the primary object of the present invention to overcome the inherent difficulty of finding and tracking celestial objects with a telescope mounted in an altazimuth mount.

It is another object of the present invention to provide a system for readily performing the initial orientation of an altazimuth telescope mount.

The present invention provides a motor driven altazimuth telescope mount that moves a telescope to any point in the sky and tracks that point. The initial orientation is performed by a program executed by a microprocessor. Orientation is achieved by selecting a first known point (e.g. star) and inputting the coordinates of the known point through a keyboard. The telescope is aligned to the selected point and the program notified via manual control. A second known point is selected and the procedure is repeated. The microprocessor then calculates the zenith coordinates (overhead point) from the coordinates of the two known points, the elapsed time, and the angles the motors moved from the first to the second known point. Thereafter, the coordinates of a selected point may be entered and the telescope will automatically point at the selected point.

After orientation, the program periodically updates the zenith coordinates and re-positions the telescope to keep it aligned to the selected point as it moves due to the earth's rotation. This continues until another point is selected or the manual control is operated.

If the coordinates of a new point are entered, the microprocessor calculates the angles the motors must move and generates the signals necessary for the motors to align the telescope to it. When the telescope is aligned, the program reverts to tracking the new point.

If the manual control is operated, the program stops tracking. Signals are generated to move the motors in the direction(s) indicated by the manual control. The manual control can indicate to the microprocessor that tracking is to be resumed. The microprocessor then calculates the coordinates of the point to which the telescope is currently aligned, using the current motor positions as input, and reverts to the tracking mode.

DESCRIPTION OF THE PREFERRED EMBODIMENT

Definitions of certain key terms are set forth in the APPENDIX below. Also, certain equations referred to hereafter and in FIGS. 4–9 are also set forth in the APPENDIX.

Figure 1:
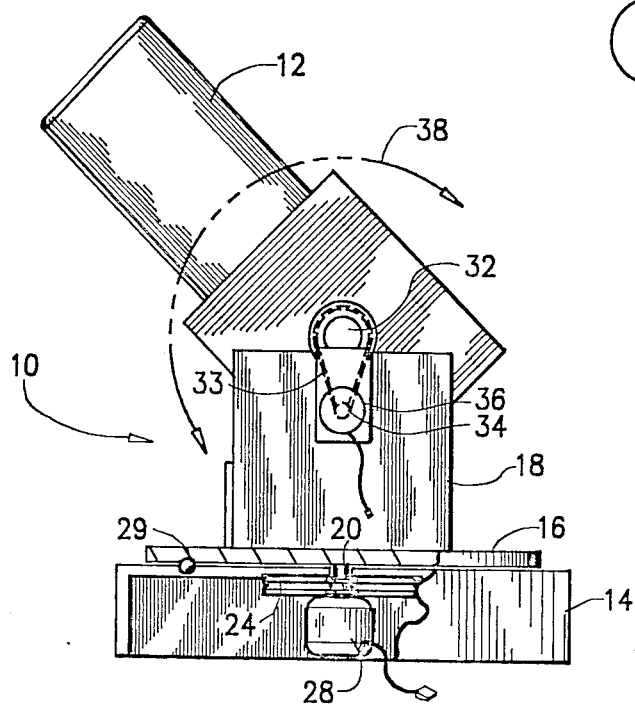
FIG. 1 is a side elevation view of a telescope supported on an altazimuth mount in accordance with a preferred embodiment of the present invention.
Figure 2:
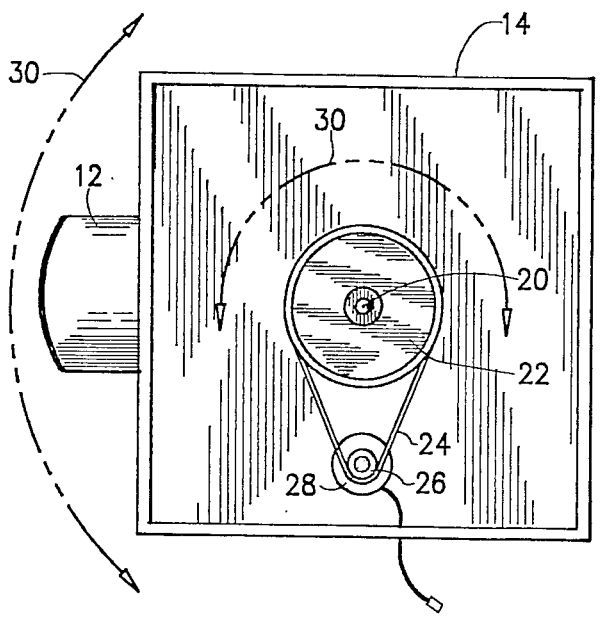
FIG. 2 is a bottom view of the altazimuth mount illustrated in FIG. 1.

FIGS. 1 and 2 illustrate an altazimuth mount 10 supporting a telescope 12 in accordance with the present invention. The altazimuth mount 10 includes a box-like base 14 which supports a circular horizontal altazimuth platform 16 for rotation about a vertical axis. A pair of vertical, spaced apart arms 18 are carried by the altazimuth platform 16 and support the telescope 12 for rotation therebetween about a horizontal axis.

A vertical shaft 20 (FIG. 2) is rigidly connected at its upper end to the center of the circular altazimuth platform 16 and to an azimuth sprocket 22 at its lower end. A drive chain 24 is entrained about the azimuth sprocket 22 and a smaller drive sprocket 26 coupled to the shaft of an azimuth stepper motor 28. The altazimuth platform 16 is also supported on the base 14 by a peripheral bearing 29. The stepper motor 28 may be energized to rotate the telescope three hundred and sixty degrees about a vertical axis as indicated by the dashed line arcs 30 in FIG. 2. Such rotation can be done in very small increments in either the clockwise or counter-clockwise direction in FIG. 2.

The telescope is provided with bearings 32 (FIG. 1) on each side thereof which are rotatably supported by suitable means attached to the upper ends of the corresponding vertical arms 18. A drive chain 33 is rigidly secured to one of the bearings 32 and is entrained about a smaller diameter drive sprocket 34 coupled to the shaft of an altitude stepper motor 36. The stepper motor 36 can be energized to rotate the telescope 12 about a horizontal axis as indicated by the dashed line arc 38 in FIG. 1. Such rotation can be done in very small increments in either the clockwise or counter-clockwise direction in FIG. 1.

Figure 3:
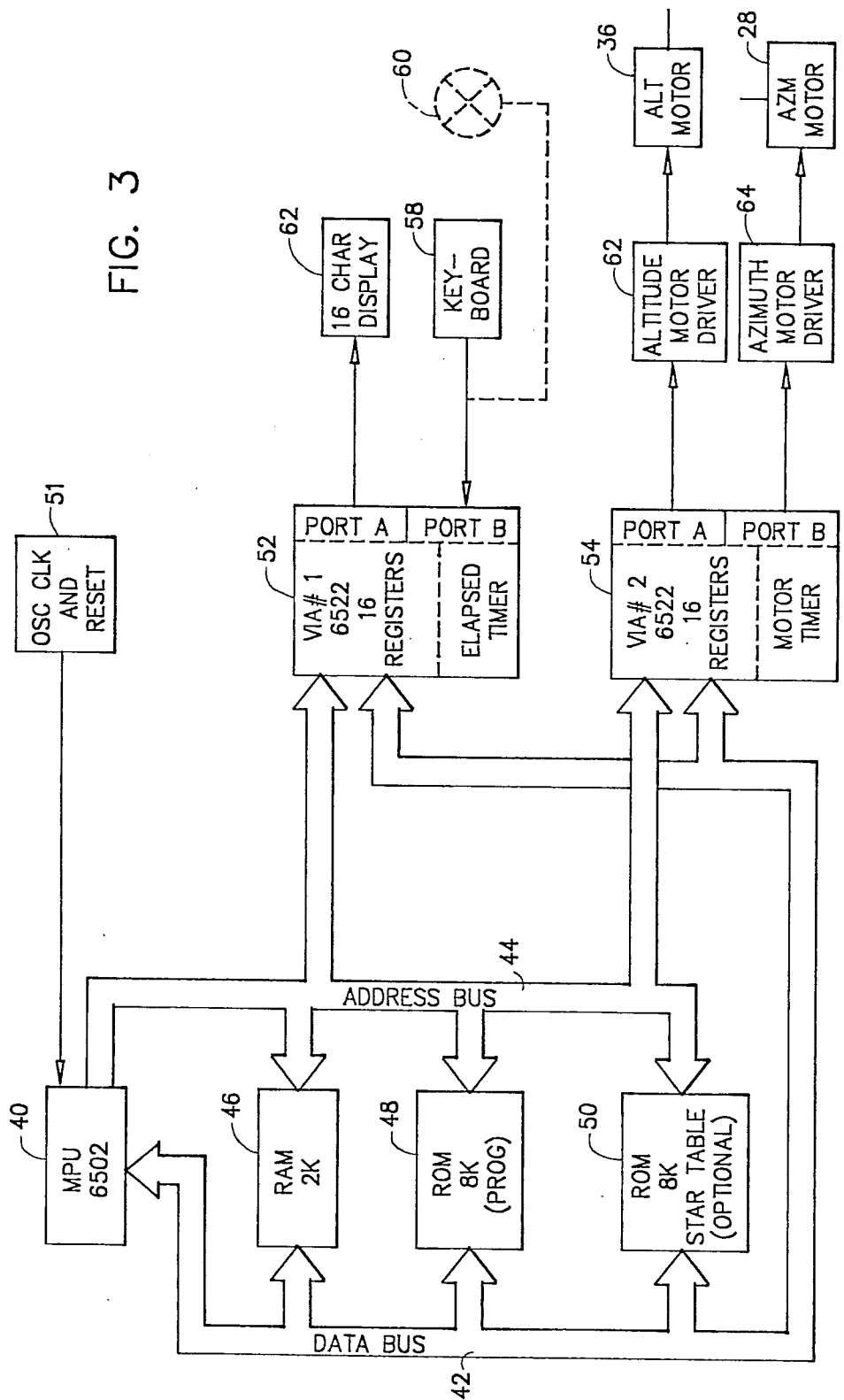
FIG. 3 is a functional block diagram of the control system forming a portion of the preferred embodiment of the present invention.
Figure 4:
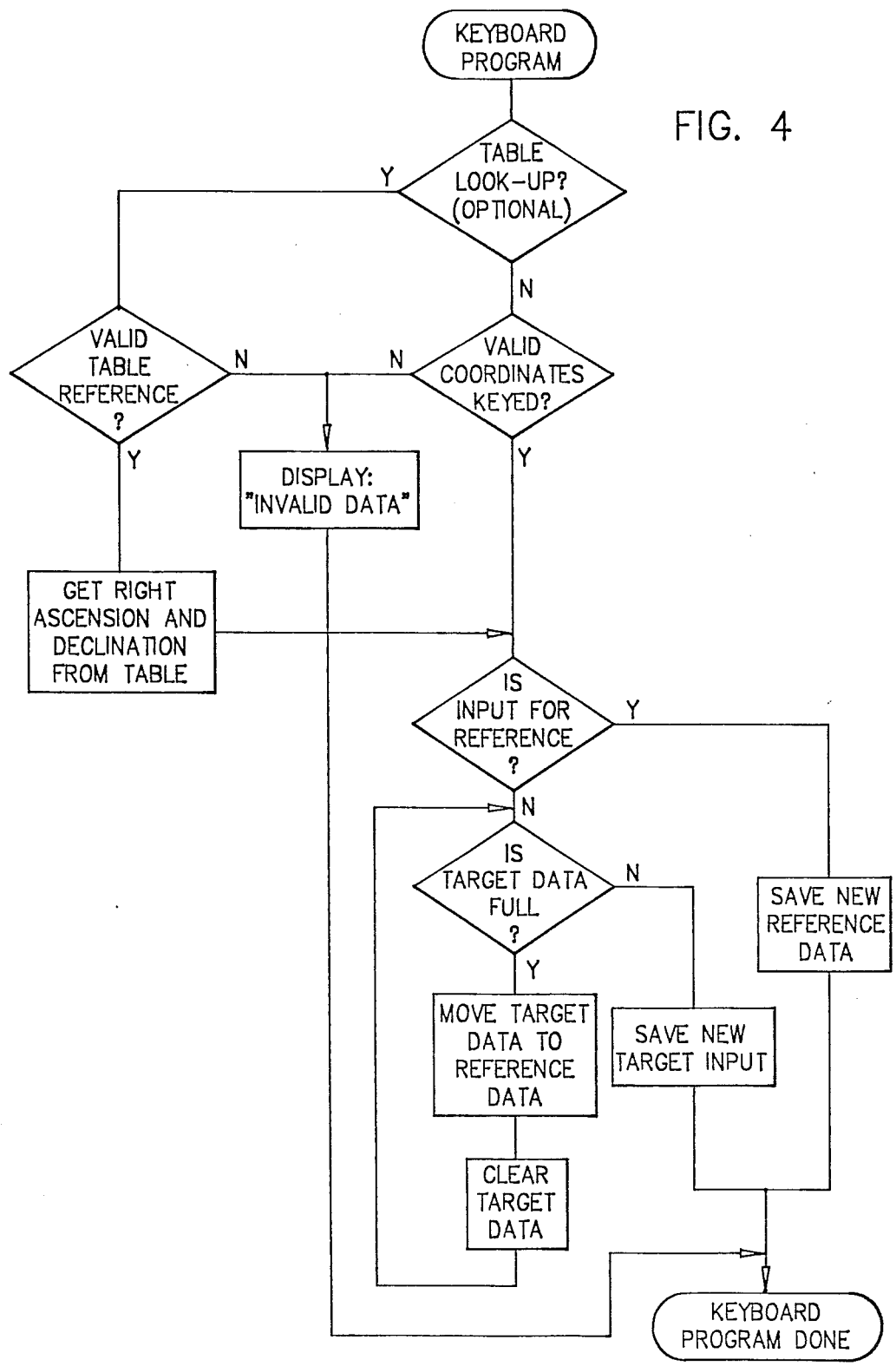

FIG. 3, illustrates the control system for driving the azimuth and altitude stepper motors 28 and 36. A microprocessor 40 is connected via data bus 42 and address bus 44 to a RAM memory 46 and a pair of separate ROM memories 48 and 50. The microprocessor 40 is connected to a clock 51 and communicates with a pair of input/output devices 52 and 54 via the address and data buses. These input/output devices also function as timers. Commercially available integrated circuits may be used to provide the aformentioned functional components as indicated by the well known part numbers in FIG. 3.

Referring still to FIG. 3, a sixteen character LCD display 56 is driven through Port A of the input/output device 52. This display is used to give a visual indication of certain information to the observer, such as the right ascension and declination of the particular star to which the telescope is currently aligned, error messages, or data inputted through a keyboard 58. This keyboard is connected to Port B of the input/output device 52. The keyboard may be used to input the right ascension and declination of a target star, or a table reference number which causes the microprocessor to obtain this information from a table stored in the ROM 50. Certain keys of the keyboard may be assigned functions such as motor direction control to allow the observer to point the telescope under manual control to a particular reference location. Another key may be assigned a lock function which causes the microprocessor to calculate the right ascension and declination of a star or other location to which the telescope is currently pointed, and to resume automatic tracking of that star or location. Optionally, a joystick 60 may be connected to Port B of the input/output device 52 to provide a convenient means of manually pointing the telescope.

Continuing with FIG. 3, the altitude stepper motor 36 is driven by a motor driver 62. The azimuth stepper motor 28 is driven by a separate motor driver 64. One suitable motor driver is the Model 2D3128 commercially available from Anaheim Automation. This driver is capable of receiving direction and clock signals as directed by the microprocessor and providing the currents and phases required to drive the motors in the appropriate directions and amounts.

The input/output devices 52 and 54 contain timers that are used to provide several functions. The timer of the device 54 is used to generate interrupts for a motor program. This timer is set by an operation program with an interval that determines the motor speed. The motor may be made to run slowly, for small telescope movements, or rapidly, as, for example, in searching a new star. The operation program executed by the microprocessor is stored in the ROM 48. Various sub-programs contained in the operation program are illustrated in FIGS. 4–9.

The timer of the device 52 is used to increment a continuous time interval counter. The continuous time interval counter is reset to zero at power on, and for every interruption of the operation program by the timer, is incremented by one. The value of the continuous time interval counter is stored in the RAM memory 46 when significant events are logged, such as, for example, the acquisition of the reference or the target objects. These logged values of the continuous time interval counter may then be used to determine, for example, how much time has elapsed between the acquisition of the reference object and the target object. Or, as another example, how much time has passed since the altazimuth mount was first oriented, so that the current location of zenith, or a star may be calculated.

For purposes of the following discussion, the term "star" shall refer to any particular point on that celestial hemisphere currently above the observer's horizon. The term "coordinates" shall refer to the right ascension and declination of a star. The term "zenith point" shall refer to that point pierced by the vertical axis of the altazimuth mount indefinitely extended upward. This zenith coincides with true zenith (the overhead point) only if the telescope is level; that is, its vertical axis passes through the earth's center. My invention may still function properly even if the telescope is not level. Therefore, the zenith as defined here need not coincide with the true zenith.

The following method may be used to align the telescope optical axis to the vertical axis of the mount. The optical axis of the telescope is not necessarily perpendicular to the horizontal axis that passes through the centers of the telescope bearing. The mirror is adjusted (collimated) according to laws of optics. The mirror is tilted, for example, by adjusting the length of the three screws supporting it until the best resolution of the light is obtained through the eyepiece. The mirror is then not necessarily parallel to the horizontal axis of the telescope tube. In order for the operation program of my preferred embodiment to function correctly, the mirror must lie in a plane parallel to the horizontal axis.

The solution to this problem is set forth hereafter. By using a gravity level, such as a carpenter's bubble level, the azimuth platform is made level by placing shims under the edge until the bubble is centered. The level is then removed and the telescope support is placed on the azimuth platform with the horizontal axis parallel to the level dimension of the azimuth platform. The mirror is removed from the telescope, and the bubble level, attached to a circular piece of wood of the same diameter as the telescope mirror, is substituted. With the telescope pointing straight up, the idle support bearing bracket is adjusted vertically until the bubble indicates levelness. This is the correct height for the idle support bearings bracket. The mirror will now be parallel to the azimuth platform, which in turn is perpendicular to the vertical axis.

The azimuth platform can be left unlevel (unshimmed) if the position of the bubble off-center can be remembered and duplicated when it is substituted for the mirror. The important thing is that the mirror should be parallel to the azimuth platform.

The illustrated embodiment of my invention will be considered to be oriented if the control system knows the coordinates of the zenith point. When power is initially applied to the control system, it is not oriented and only limited functions are available. The limited functions include accepting data from the keyboard, displaying the input data and moving the altitude and azimuth motors under the control of the direction keys, or, optionally, the joystick. These functions, if properly used by the observer, will result in an oriented state.

To orient the system, the observer must choose any two stars that he will use to do the orientation. The first star is called the "reference" and the second star is called the "target". Presumably, the choice will be bright, easy to find stars. The observer uses the keyboard to sequentially state the coordinates of the reference and target or, optionally, to enter a table reference number that the controller uses to look up the coordinates in a table of selected coordinates stored in the ROM 50 for this purpose. If the coordinates are valid, the microprocessor executes a keyboard program (FIG. 4) and stores the coordinates in a location in the RAM 46 reserved for this purpose. In addition, the observer, using the assigned direction keys, or, optionally, the joystick, guides the telescope to the stated reference and target objects. As each of the objects are centered in the eyepiece (field of view), the observer depresses an assigned key, causing the microprocessor to store the current position of the altitude and azimuth motors and the current value of a timer in a location in the RAM 46 reserved for this purpose. The assigned key, in this instance, may have a nomenclature such as "lock", or "acquire".

It is important that the coordinates for the reference object are stated first, followed by the coordinates for the target object. Similarly, the reference object must be acquired first, followed by the acquisition of the target object. However, the data may be entered at any time with respect to the acquisitions.

Figure 5:
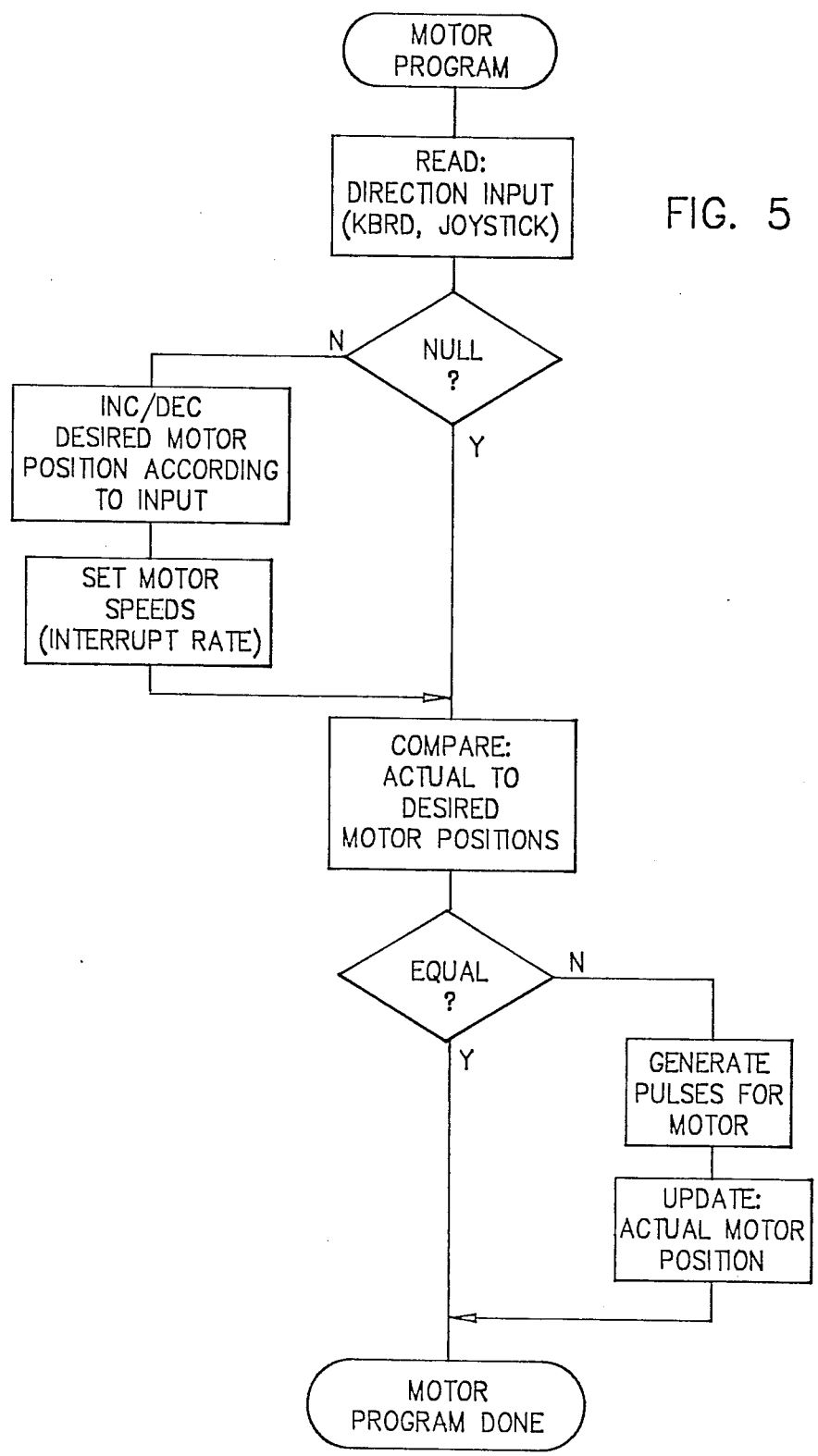

During this procedure, the microprocessor monitors the keyboard for input, and processes the keyboard input as it occurs. The microprocessor also monitors observer requests for keyboard movement and generates motor signals to move the telescope to the reference and target objects as directed by the observer. FIG. 5 illustrates a motor program that accomplishes the foregoing tasks.

Figure 6:
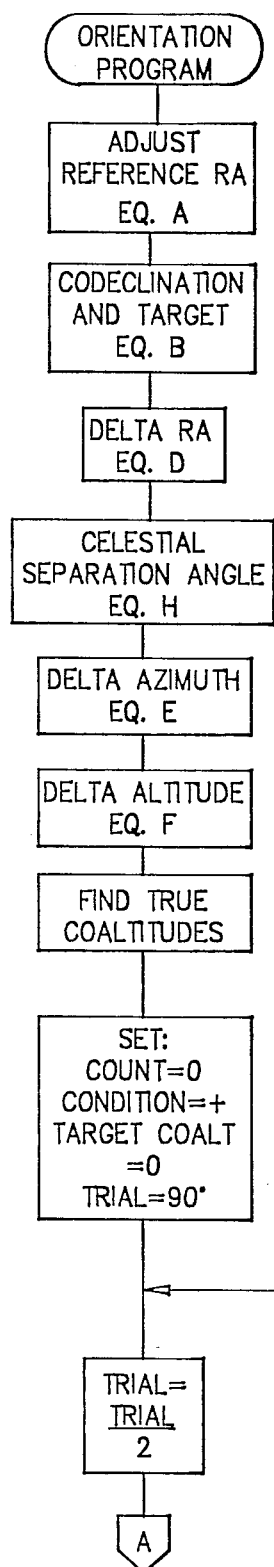
Figure 6:
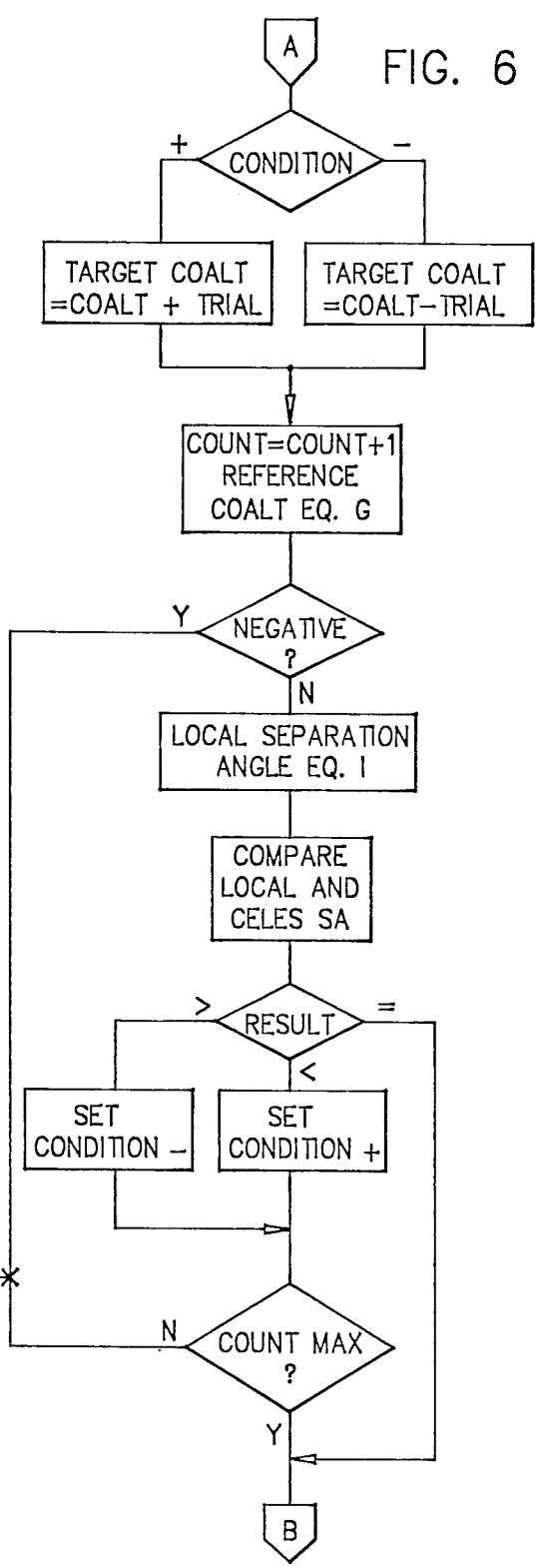

When the coordinates of the reference and target objects have been stated, and both of the objects are acquired, the microprocessor performs the orientation calculations using an orientation program such as that illustrated in FIG. 6. The reference object has moved since it was acquired, due to the earth's rotation, so the operation program adjusts the coordinates according to the time elapsed.

Figures 7, 8:
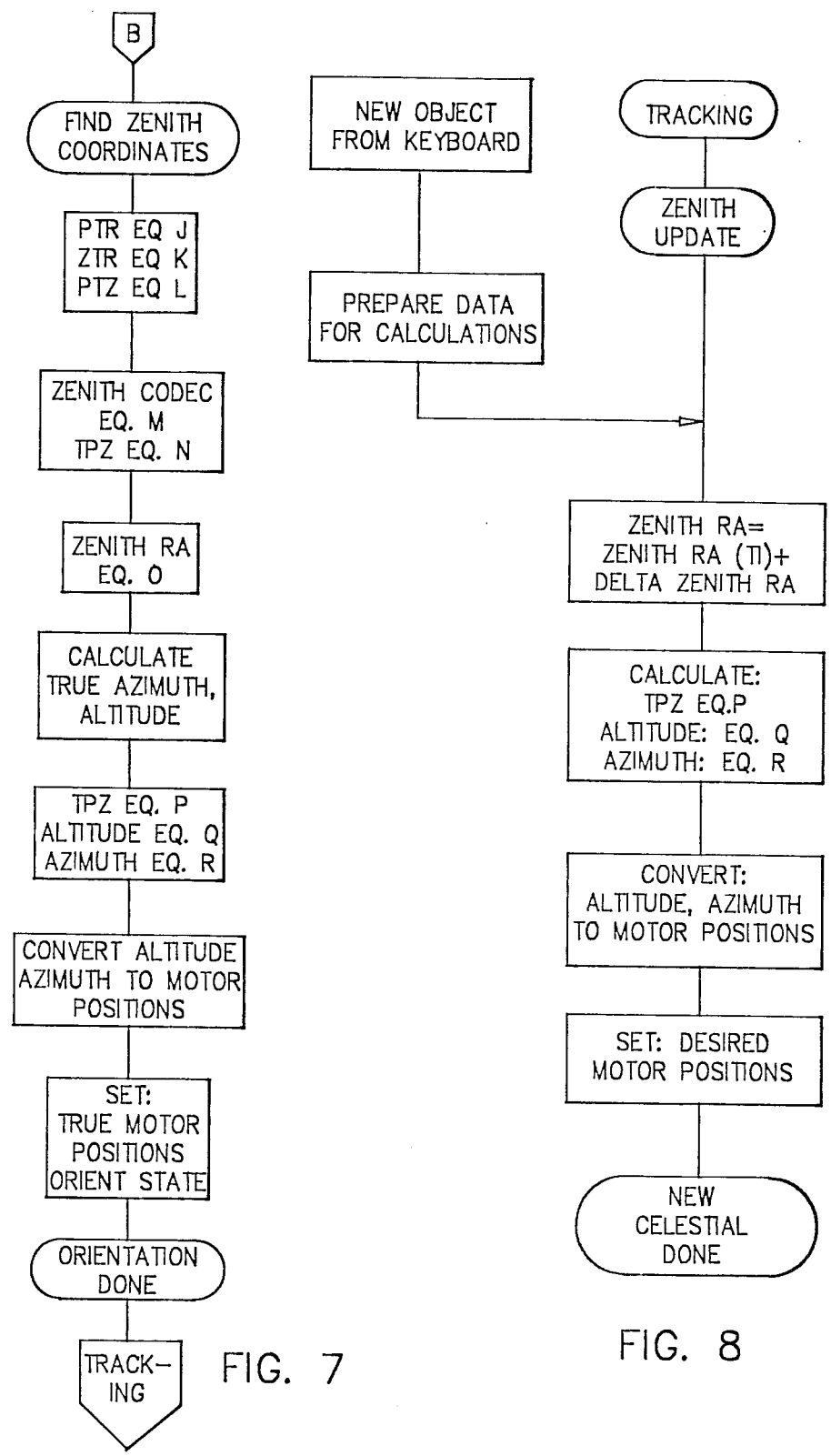

Next, the microprocessor calculates the angular distance from the target to the reference object using Equation H set forth in the APPENDIX hereafter. This is called the angle of separation. The positions of the altitude motor at the reference and the target are used to find the altitude angle between the objects {Eq. F}. Similarly, the positions of the azimuth motor at the reference and the target are used to find the azimuth angle between the objects {Eq. E}. These angles are used in an iterative procedure to find the reference and target true coaltitudes that will result in an angle of separation equal to the angle of separation as determined by the stated celestial coordinates. This procedure is illustrated in FIG. 7. That iterative procedure is an important aspect of my invention, since it permits the system to be oriented without any other input, other than that already discussed. Further calculations are performed to find the true right ascension and declination of the zenith point.

The coordinates of zenith are used to calculate the azimuth (referenced to true north). The derived coaltitude and azimuth of the target, which is the current position, are assigned to the motor positions so that subsequent motor movements are relative to the true coaltitude and azimuth. The system is now oriented.

FIG. 8 illustrates a program that enables the control system to function in a tracking mode. The microprocessor updates the coordinates of the zenith point to compensate for the earth's rotation, and calculates the current azimuth and altitude angles of the current object (target). Signals are sent to the altitude and azimuth motors to move the telescope accordingly, which results in the telescope "following" the target star as it moves across the sky. This procedure is repeated until the observer either states the coordinates of a new object via the keyboard, or he operates a direction key (or the joystick).

If the observer states the coordinates of a new object via the keyboard, the microprocessor calculates the altitude and azimuth angles for the object and generates signals for the motors to move the telescope to that object. When the telescope is aligned to the new object, the program reverts to the tracking mode.

Figure 9:
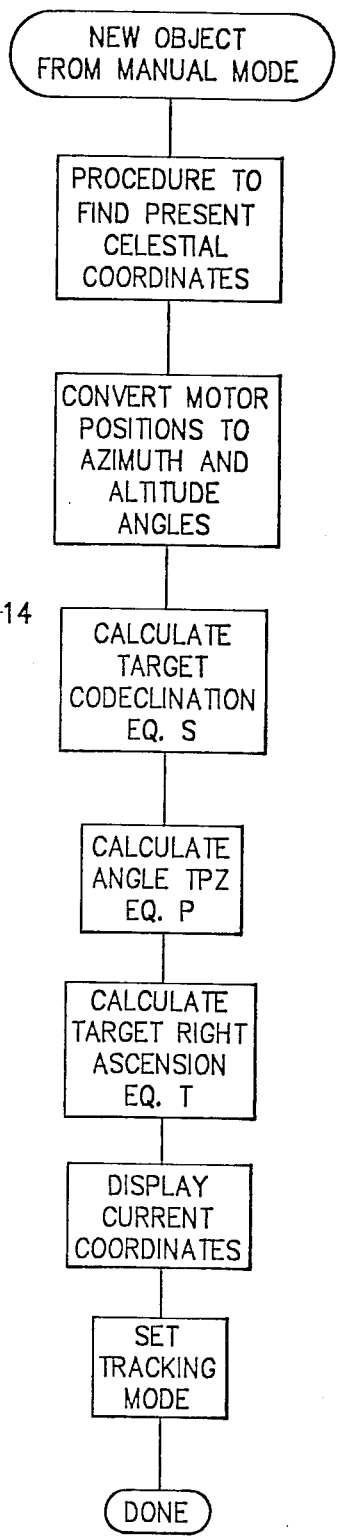
FIGS. 4–9 are a series of flow diagrams illustrating portions of an operation program executed by the control system of the preferred embodiment of the present invention.

As previously mentioned, the control system can also function in a manual mode. If the observer operates a direction key, the updating of the zenith coordinates is suspended, and the microprocessor sends signals to the motors to move them in the direction requested by the observer, thereby moving the telescope at his will. This condition exists until the observer presses a designated "lock" key, at which time the microprocessor calculates the right ascension and declination of the celestial point to which the telescope is currently aligned, and using these as the coordinates of current target, reverts to the tracking mode. FIG. 9 illustrates a program for enabling the control system to function in a manual mode.

For proper operation, the altazimuth mount must be initially adjusted to the telescope. The vertical axis of the mount must be reasonably parallel to the optical axis of the telescope. Stated differently, the observer must be able to bring the zenith point into view.

For ease of handling, the telescope is placed in the mount with the optical axis approximately horizontal (pointing toward the horizon). The control system expects the telescope to be so oriented when it is powered up, and will not allow further downward movement. This is the altitude motor lower limit until the system is oriented, at which time a true ninety degree coaltitude lower limit prevails.

When power is applied, the microprocessor does an initialization, and sends a message to the display, "MANUAL MODE", to inform the observer that he may move the telescope as he wishes by using the assigned direction keys or, optionally, the joystick. If the observer wishes to enter the right ascension and declination of a star, for the purpose of stating the coordinates of the reference or target, he presses a key assigned to a number (1, 2, etc.). Because the first key pressed is a number, the control system expects the right ascension (hours, minutes) and the declination (degrees, minutes). The display is cleared and the number that was keyed is displayed. Each number entered is appended to that already displayed so that all of the entered numbers are displayed to the observer. When the key assigned "ENTER" is pressed, the operation program verifies the numbers entered to be valid hours, minutes, etc. If the entry is not valid, the display is cleared and the message "INVALID DATA" is sent to the display. Otherwise, the entered data is stored in an appropriate location in the RAM 46 (reference or target), and the message "MANUAL MODE" is returned to the display.

Optionally, instead of entering the right ascension and declination of a star, the observer might press an assigned key, for example "-". The first depression not being a number as described before, causes the control system to expect a table reference. The display is cleared and the table reference is sent to the display as it is entered, for the observer to see. When the key assigned "ENTER" is pressed, the microprocessor checks the validity of the entered reference, and if it is valid, uses the entered reference to obtain the appropriate right ascension and declination from the table of star coordinates stored in the ROM 50. Those coordinates are stored in the RAM 46 as if they had been directly entered by the observer. The message "MANUAL MODE" is returned to the display. If the table reference entered by the observer proves to be invalid, the message "INVALID DATA" is sent to the display.

At the same time, the microprocessor monitors the direction keys and moves the telescope in the direction indicated by the observer. When the observer presses the key assigned for the function "LOCK", the microprocessor stores the current altitude and azimuth motor positions and the value of the continuous interval counter in a location in the RAM 46.

This sequence continues until the observer has entered the coordinates, motor positions, and "lock" times for both reference and target objects. The microprocessor then sends the message "FINDING ZENITH" to the display, and executes the orientation program illustrated in FIG. 6.

There are certain conditions that will cause errors in the orientation calculations. For example, if the observer chooses the same object for the reference and target (orientation on a single star), the equations fail, and the microprocessor sends a message, such as "ZENITH FAIL" to the display. Another example might be if the observer fails to "lock" on the stars whose coordinates he stated, but "locks" instead on some other star(s). Again, a message such as "ZENITH FAILED" is displayed. The microprocessor moves the target input data to the reference input data, discarding the previous reference coordinates, and the observer is expected to state the coordinates and "lock" on a new target.

If the orientation calculations are completed successfully, the "FINDING ZENITH" message is replaced by the celestial coordinates of the point being tracked (right ascension hours, minutes and declination degrees, minutes) and the microprocessor begins to execute the tracking program. Whenever the tracking program is being executed, the current celestial coordinates are displayed. Utilizing the tracking program, the microprocessor continually updates the celestial coordinates of zenith and recalculates the coaltitude and azimuth of the target. See FIG. 8. The derived coaltitude and azimuth are converted to motor positions and these values are placed in the "desired motor position" area of the RAM 46. The microprocessor then utilizes the motor program to generate the signals necessary to move the motors from the current positions to the desired positions. See FIG. 5. Thus the telescope remains aligned to the target in its apparent motion due to the earth's rotation.

There are certain conditions that will cause errors in the tracking calculations. For example, if the star moves below the horizon (the star sets), and can no longer be tracked, or if the observer enters the coordinates of a star that is not above the horizon. The microprocessor utilizes the tracking program to detect such errors and sends a message to the display, for example "TRACKING ERROR" and exits to manual mode (tracking stops).

If the observer presses a direction key when tracking, the tracking is suspended and the microprocessor moves the telescope according to the direction keys and the message "MANUAL MODE" is displayed. This continues until the observer presses the key assigned "LOCK", causing the microprocessor to calculate the current celestial coordinates from the motor positions (see FIG. 9) and then return to the tracking program, which again displays the coordinates of the star being tracked again.

When in manual mode, the altitude motor position is compared to a maximum and minimum (zenith and horizon, respectively). The microprocessor will ignore the direction keys, or, optionally, the joystick, if the motor would move beyond these positions. This is a program controlled motor limit to restrict the movement of the telescope so that it does not "crash" into the mount.

Similarly, the azimuth motor may not be driven more than approximately one-hundred and eighty degrees in either direction. At power on, and before orientation, the azimuth motor may be moved approximately one-hundred and eighty degrees from its position at power on. After orientation, the azimuth motor may be moved approximately one-hundred and eighty degrees either direction from true north. This program controlled azimuth motor limit is to prevent the observer from turning the telescope continuously in the horizontal direction for more than one full turn, which would result in an altitude motor cable becoming fouled.

APPENDIX

VARIABLE DEFINITIONS:

Azimuth: The angle of the azimuth motor from its location at the time power was applied (unoriented), or from true north (oriented), measured counter-clockwise.

Altitude: The angle of the altitude motor from the horizon (oriented).

Coaltitude: 90—Altitude. The angle of the altitude motor from the mount zenith (oriented).

Codeclination: 90—Declination.

PTR (Pole-Target-Reference): The angle, at the target, formed by the lines from the target to the pole, and the target to the reference.

PTZ—(Pole-Target-Zenith): The angle, at the target, formed by the lines from the target to the pole, and the target to the zenith.

Separation Angle (Celestial or local): The great circle distance from the reference to the target.

T1: The value of the continuous interval timer when the reference is "locked".

T2: The value of the continuous interval timer when the target is "locked".

TPZ (Target-Pole-Zenith): The angle, at the pole, formed by the lines from the pole to the target, and the pole to zenith.

ZTR (Zenith-Target-Reference): The angle, at the target, formed by the lines from the target to zenith, and the target to the reference.

EQUATIONS:

EQUATION (A)
REFERENCE RA(T1)=REFERENCE RA(TI)−(T2−T1)×V, V=Rate of earth's rotation, RADIANS/SEC

EQUATION (B)
CODECLINATION=90−DECLINATION

EQUATION (C)
COALTITUDE=90−ALTITUDE

EQUATION (D)
DELTA RA=TARGET RA−REFERENCE RA
NOTE: DELTA RA is adjusted to be −180<DELTA RA<+180

EQUATION (E)
DELTA AZIMUTH=TARGET AZIMUTH−REFERENCE AZIMUTH
NOTE: DELTA AZIMUTH is adjusted to be −180<DELTA AZIMUTH<+180

EQUATION (F)
DELTA ALTITUDE=TARGET ALTITUDE−REFERENCE ALTITUDE

EQUATION (G)
REFERENCE COALTITUDE=TARGET COALTITUDE−DELTA ALTITUDE

EQUATION (H)
COS(CELESTIAL SEPARATION ANGLE)=SIN(REFERENCE CO-DECLINATION)×SIN(TARGET CO-DECLINATION)×COS(DELTA RIGHT ASCENSION)+COS(REFERENCE CO-DECLINATION)×COS(TARGET CO-DECLINATION)

EQUATION (I)
COS(LOCAL SEPARATION ANGLE)=SIN(REFERENCE CO-ALTITUDE)×SIN(TARGET CO-ALTITUDE)×COS(DELTA AZIMUTH)+COS(REFERENCE CO-ALTITUDE)×COS(TARGET CO-ALTITUDE)

EQUATION (J)
COS(PTR)={COS(REFERENCE CO-DECLINATION)−COS(CELESTIAL SEPARATION ANGLE)×COS(TARGET CO-DECLINATION)} divided by {SIN(CELESTIAL SEPARATION ANGLE)×SIN(TARGET CO-DECLINATION)}
NOTE: Angle PTR is assigned the opposite direction of DELTA RA.

EQUATION (K)
COS(ZTR)={COS(REFERENCE CO-ALTITUDE)−COS(LOCAL SEPARATION ANGLE)×COS(TARGET CO-ALTITUDE)} divided by }SIN(LOCAL SEPARATION ANGLE)×SIN(TARGET CO-ALTITUDE)}
NOTE: Angle ZTR is assigned the opposite direction of DELTA AZIMUTH.

EQUATION (L)
PTZ=PTR−ZTR
NOTE: Angle PTZ is adjusted to be −180<PTZ<+180.

EQUATION (M)
COS(ZENITH CO-DECLINATION)=SIN(TARGET CO-DECLINATION)×SIN(TARGET CO-ALTITUDE)×COS(PTZ)+COS(TARGET CO-DECLINATION)×COS(TARGET CO-ALTITUDE)

EQUATION (N)
COS(TPZ)={COS(TARGET CO-ALTITUDE)−COS(ZENITH CO-DECLINATION)×COS(TARGET CO-DECLINATION)} divided by }SIN(ZENITH CO-DECLINATION)×SIN(TARGET CO-DECLINATION)}
NOTE: Angle TPZ is assigned the same direction as Angle PTZ (for calibrate). Angle TPZ is assigned the same direction as DELTA AZIMUTH (for new acquisition).

EQUATION (O)
ZENITH RA=TARGET RA+TPZ
NOTE: ZENITH RA is adjusted to be −180<ZENITH RA<+180

EQUATION (P)
TPZ(TRACKING)=ZENITH RA−TARGET RA
NOTE: Angle TPZ is adjusted to be −180<TPZ<+180

EQUATION (Q)
COS(TARGET CO-ALTITUDE)=SIN(TARGET CO-DECLINATION)×SIN(ZENITH CO-DECLINATION)×COS(TPZ)+COS(TARGET CO-DECLINATION)×COS(ZENITH CO-DECLINATION)

EQUATION (R)
COS(AZIMUTH)={COS(TARGET CO-DECLINATION)−COS(ZENITH CO-DECLINATION)×COS(TARGET CO-ALTITUDE)} divided by {SIN(ZENITH CO-DECLINATION)×SIN(TARGET CO-ALTITUDE)}
NOTE: AZIMUTH is assigned the same direction as Angle TPZ.

EQUATION (S)

COS(TARGET CO-DECLINATION)=SIN(-TARGET CO-ALTITUDE)×SIN(ZENITH CO-DECLINATION)×COS(AZIMUTH)-+COS(TARGET CO-ALTITUDE)×COS(-ZENITH CO-DECLINATION)

EQUATION (T)

TARGET RA=ZENITH RA−TPZ

NOTE: TARGET RA is adjusted to be −180<CELESTIAL TARGET RA<+180.

Having described a preferred embodiment of my computer controlled altazimuth telescope mount, modifications and adaptations thereof will occur to those skilled in the art. Therefore, the protection afforded my invention should only be limited in accordance with the scope of the following claim and reasonable equivalents thereof.

I claim:

1. An automatically pointing earth-based telescope system, comprising:

a telescope;

means for supporting the telescope for independent rotation about substantially orthogonal first and second axes;

first motor means for rotating the telescope about the first axis;

second motor means for rotating the telescope about the second axis;

a processor;

memory means connected to the processor for storing an operation program and data representing a star table;

means connecting the processor to the first and second motor means for actuating the same;

means connected to the processor for manually inputting thereto the coordinates of a first known star when the telescope is pointed at the same and the coordinates of a second known star when the telescope is pointed at the same;

means connected to the processor for providing the processor with a set of angular data representing first and second angles of travel of the telescope about the first and second axes, respectively, between the pointings of the telescope at the first and second known stars;

means connected to the processor for providing the processor with a set of time data representing an amount of elapsed time between the pointings of the telescope at the first and second known stars;

the processor being capable of executing the operation program and using the data representing the star table to calculate the coordinates of a zenith location from the coordinates of the first and second known stars, the first and second angles and the elapsed time, and for thereafter automatically causing the telescope to point at a third star upon manual input of its coordinates, and for thereafter causing the telescope to automatically track the third star to compensate for the earth's rotation.

* * * * *